(12) United States Patent
Zhao et al.

(10) Patent No.: US 11,332,570 B2
(45) Date of Patent: May 17, 2022

(54) FLEXIBLE FOAMS

(71) Applicant: Covestro Deutschland AG, Leverkusen (DE)

(72) Inventors: Dong Bo Zhao, Shanghai (CN); Weicheng Wu, Shanghai (CN); Zoe Deng, Shanghai (CN); Demi Tang, Shanghai (CN); Liqiang Li, Shanghai (CN)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 376 days.

(21) Appl. No.: 16/411,455

(22) Filed: May 14, 2019

(65) Prior Publication Data

US 2019/0352445 A1 Nov. 21, 2019

(30) Foreign Application Priority Data

Aug. 17, 2018 (EP) ..................................... 18189486

(51) Int. Cl.
| | | |
|---|---|---|
| *C08G 18/48* | (2006.01) | |
| *C08G 18/73* | (2006.01) | |
| *C08J 9/00* | (2006.01) | |
| *C08G 18/75* | (2006.01) | |
| *C08G 18/32* | (2006.01) | |
| *C08G 18/66* | (2006.01) | |
| *C08G 18/24* | (2006.01) | |
| *C08G 18/10* | (2006.01) | |

(52) U.S. Cl.
CPC ......... *C08G 18/4833* (2013.01); *C08G 18/10* (2013.01); *C08G 18/244* (2013.01); *C08G 18/3206* (2013.01); *C08G 18/4825* (2013.01); *C08G 18/4829* (2013.01); *C08G 18/6611* (2013.01); *C08G 18/73* (2013.01); *C08G 18/755* (2013.01); *C08G 18/758* (2013.01); *C08J 9/0061* (2013.01); *C08G 2110/005* (2021.01); *C08G 2110/0008* (2021.01); *C08G 2110/0058* (2021.01); *C08J 2205/06* (2013.01); *C08J 2375/04* (2013.01)

(58) Field of Classification Search
CPC .. C08G 18/10; C08G 18/244; C08G 18/3206; C08G 18/3275; C08G 18/4812; C08G 18/4816; C08G 18/4825; C08G 18/4829; C08G 18/4833; C08G 18/6611; C08G 18/6677; C08G 18/6681; C08G 18/722; C08G 18/725; C08G 18/73; C08G 18/755; C08G 18/758; C08G 18/792; C08G 2110/0008; C08G 2110/005; C08G 2110/0058; C08J 9/0061; C08J 2205/06; C08J 2375/04

See application file for complete search history.

(56) References Cited

U.S. PATENT DOCUMENTS

| | | | |
|---|---|---|---|
| 4,250,137 A | 2/1981 | Riedler | |
| 4,256,841 A | 3/1981 | Horacek et al. | |
| 5,147,897 A | 9/1992 | Morimoto et al. | |
| 6,204,300 B1 * | 3/2001 | Kageoka | C08G 18/4804 521/174 |
| 2006/0160977 A1 | 7/2006 | Ou | |
| 2009/0143495 A1 * | 6/2009 | Nozawa | C08G 18/4891 521/157 |
| 2011/0263741 A1 | 10/2011 | Tu | |
| 2013/0178550 A1 * | 7/2013 | Aou | C08G 18/283 521/176 |

FOREIGN PATENT DOCUMENTS

| | | | |
|---|---|---|---|
| CN | 101157747 | A | 4/2008 |
| CN | 101412798 | A | 4/2009 |
| CN | 101580575 | A | 11/2009 |
| EP | 1721720 | A1 | 11/2006 |
| JP | 2000226429 | A | 8/2000 |
| JP | 200172738 | A | 3/2001 |
| JP | 2003012756 | A | 1/2003 |
| JP | 2006257187 | A | 9/2006 |
| JP | 2010195945 | A | 9/2010 |

* cited by examiner

*Primary Examiner* — John M Cooney
(74) *Attorney, Agent, or Firm* — Faegre Drinker Biddle & Reatih LLP

(57) ABSTRACT

The present invention relates to a composition for preparing flexible foams and the application thereof. The composition comprises the following components: a. an isocyanate mixture comprising: a1) an aliphatic and/or alicyclic isocyanate monomer, and a2) an aliphatic and/or alicyclic; isocyanate trimer, wherein the mass ratio of said monomer to said trimer is in a range of 3:1-200:1; b. a polymer polyol mixture comprising: b1) a first polyether polyol having a number average molecular weight of not less than 3000 g/mol with an ethylene oxide content of 5-20 wt. %, b2) a second polyether polyol having a number average molecular weight of not less than 3000 g/mol with an ethylene oxide content of more than 60 wt. %, wherein the mass ratio of said first polyether polyol to said second polyether polyol is in a range of 4:1-100:1; c. an isocyanate-reactive group comprising compound having a number average molecular weight of 32-400 g/mol; d. a catalyst; e. a foaming agent; and f. optionally, an additive; wherein said composition has an isocyanate index of 70-120.

8 Claims, No Drawings

FLEXIBLE FOAMS

CROSS-REFERENCE TO RELATED APPLICATIONS

This application claims priority to Chinese Application No. 201810461713.6, filed May 15, 2018, and European Application No. 1201810461713.6, filed Aug. 17, 2018, both of which are incorporated herein by reference in their entirety.

TECHNICAL FIELD

The present invention relates to a composition for preparing flexible foams and the application thereof.

BACKGROUND OF THE ART

Flexible foams, especially flexible polyurethane foams, are often used in the field such as textiles. Flexible polyurethane foams are generally prepared by reacting isocyanates with isocyanate-reactive compounds comprising at least two active hydrogen atoms in the presence of a foaming agent, a catalyst, a siloxane-based surfactant and other additives, wherein the isocyanate-reactive compounds comprising active hydrogen atoms are generally polyols, primary polyamines, secondary polyamines, and water.

Aromatic isocyanates such as toluene diisocyanate (TDI) or diphenylmethane diisocyanate (MDI) and the like are widely used for the preparation of flexible and rigid polyurethane foams due to their relatively high reactivity. U.S. Pat. No. 4,250,137 discloses a method of heating an aromatic flexible polyurethane foam to a temperature above its glass transition temperature (Tg) using high temperature molds at 176-204° C. before pressing, cooling and moulding so that it can be used as an underwear pad. The underwear pad made from aromatic flexible polyurethane foams quickly turns yellow because of the diquinone-imine compound leading to yellowing produced during photooxidation when it is exposed to light or contacted with air, which results in a trouble for both the production and use.

Therefore, it is desirable to develop a method for preparing flexible polyurethane foams without using aromatic isocyanates.

U.S. Pat. No. 5,147,897 discloses a method for preparing a non-yellowing polyurethane foam by using an aliphatic isocyanate prepolymer, wherein the aliphatic isocyanate prepolymer is reacted with water in an amount of 0.4-5 times of the aliphatic isocyanate prepolymer equivalent in the presence of potassium or sodium salt of $C_2$-$C_{10}$ alkanoic acids or a diazabicycloalkene catalyst. The aliphatic isocyanate prepolymer is obtained by the addition polymerization of a polyol having an average molecular weight of 100-5,000 and an aliphatic isocyanate in an amount of 2.6-14 times of the hydroxyl equivalent. This method cannot be used to prepare flexible polyurethane foams having a density of less than 80 kg/m$^3$ nor can it be used to prepare molding foams. Polyurethane foams made by this method tend to have closed cells. EP1721720A1 especially studies the post-treatment of non-yellowing polyurethane foams to improve the breathability of the foams.

US 20060160977 discloses a preparation of a non-yellowing and breathable aliphatic polyurethane foam by using an isocyanate and a polyether mixture containing polyether polyol of a functionality of 2.7-6.0, a hydroxyl value of 150-300 and a content of 50-80 wt. % based on total polyol mixture, wherein the isocyanate comprises at least two aliphatic and/or alicyclic isocyanate monomers where the NCO groups are directly attached to aliphatic carbon atoms, such as a combination of IPDI and HDI or a combination of Desmodur W and HDI. The polyurethane foam prepared by this method has the problem of VOC volatilization.

U.S. Pat. No. 4,256,841 discloses a polyurethane foam prepared by using an aliphatic and/or alicyclic polyisocyanate, preferably comprising an aliphatic and/or alicyclic polyisocyanate modified by biuret groups, together with a polyester polyol and/or a polyether polyol in the presence of a carboxylate salt and dibutyl-tin dilaurate catalyst. The dibutyl-tin dilaurate catalyst used in this method is often banned in the flexible polyurethane foam industry.

JP 2010195945A discloses a flexible polyurethane foam prepared by using an isocyanate component and a hydroxyl group-comprising isocyanate active compound having a functionality of 2-8. Said isocyanate component comprises an allophanate-modified polyisocyanate and an isocyanurate-modified polyisocyanate in a ratio of 1:1-9:1. The flexible polyurethane foam obtained by this method is resistant to yellowing and heat and has good mechanical properties.

JP 2006-257187A discloses a method for preparing a flexible polyurethane foam almost free from yellowing by reacting a polyethylene oxide-polypropylene oxide copolymer polyol with a polyisocyanate component. The polyisocyanate component comprises isophorone diisocyanate (IPDI) and/or a trimer of isophorone diisocyanate or a derivative thereof, a trimer of hexamethylene diisocyanate (HDI) and/or a derivative of hexamethylene diisocyanate, the weight ratio of the above two being 7:3-3:7. In addition to the good resistance to UV and $NO_x$ yellowing, the flexible polyurethane foam has good durability. The shortcoming of the polyurethane foam is that its relatively high hardness leads to a decrease in elongation and tensile/anti-tearing strength, which affects its use. Moreover, addition of more isocyanate components is required in the preparation process to obtain a suitable isocyanate index due to the decrease of the contents of isocyanate groups in the trimers and derivatives thereof in the reactants. As a result, the preparation cost of the foam is increased.

JP2000226429A discloses a process for preparing a flexible polyurethane foam by reacting a polyester polyol or a polyether polyol with an isocyanate component, wherein the isocyanate component consists of 50-99.5 wt. % of an aliphatic or alicyclic isocyanate and 0.5-50 wt. % of a trimer of aliphatic and/or alicyclic isocyanate having a polymerization functionality not higher than 5. The foam prepared by this method shows good yellowing resistance.

A highly active polyol component including highly reactive polyethylene oxide-polypropylene oxide copolymer having a high content of ethylene oxide or amine-terminated polypropylene oxide copolymer polyol is reacted with a low reactive aliphatic isocyanate or alicyclic isocyanate in the industry in order to achieve a reaction rate similar to the aromatic isocyanate foaming process.

CN 101157747A discloses a method for preparing a polyurethane foam by reacting a polyethylene oxide-polypropylene oxide copolymer having a content of ethylene oxide of 8.25 wt. % with an isocyanate.

JP 2003-012756A discloses a method for preparing an almost non-yellowing polyurethane foam by the reaction of an alicyclic diisocyanate with an amine-terminated polypropylene oxide copolymer polyol. This application further discloses that the amine-terminated polypropylene oxide copolymer polyol is difficult to be obtained in practical application for its high price and limited supply.

The flexible polyurethane foam prepared by the method as mentioned above tends to swell and deform due to absorbing water and softening during the washing process, and thus may be limited in applications such as fabrics. Therefore, attempts have been made in the industry to develop flexible polyurethane foams having a low density and excellent weather resistance and washing deformation resistance.

CN101580575A discloses a flexible polyurethane foam prepared by the reaction of an aliphatic isocyanate and/or alicyclic isocyanate and/or an aromatic isocyanate in which no isocyanate group is directly attached to an aromatic ring with an isocyanate active mixture comprising polyoxyalkylene glycol compound, a foaming agent and a catalyst. The produced foam has excellent weather resistance and washing deformation resistance.

JP 2001-72738A discloses a polyurethane foam prepared by reacting an aliphatic diisocyanate with a polyol having an ethylene oxide content less than 18 part by weight (based on the amount of polyol as 100 part by weight) in the presence of diazabicycloalkene and a phenyl salt thereof and an alkali metal salt of weak acids. The polyurethane foam exerts a yellowing resistance and is excellent in weather resistance and washing deformation resistance. The shortcomings of the polyurethane foam include collapse tendency and production difficulties caused by the extremely narrow operation window between the closed cells and the shrinkage of the foam. In addition, the catalyst DBU used in the preparation process of the polyurethane foam has a low boiling point and may be easily discharged from the foam. As a result, a large amount of VOC is discharged from the foam.

CN 101412798 discloses a process for preparing a polyurethane foam by using two different kinds of isocyanate actives and an isocyanate which contains no isocyanate group directly connected to an aromatic ring, wherein the first isocyanate active has a hydroxyl functionality of at least 2.6, a hydroxyl equivalent of less than 800 and a hydroxyl value more than 70 mgKOH/g; the second isocyanate active has a hydroxyl functionality of less than 6, a hydroxyl equivalent of 600-6000, a hydroxyl value of 9-94 mgKOH/g and a primary hydroxyl content of at least 30 wt. %; the mass ratio of the first isocyanate active to the second isocyanate active is (20-90):(80-10). The polyurethane foam obtained by this method has a poor hand feel.

In summary, it is desired to provide a non-yellowing flexible polyurethane foam which enables satisfying the comprehensive requirements of the textile industry for high resilience, good breathability, washing resistance, good tensile strength, high ductility, tunable hardness and hand feel of the foam in the industry.

SUMMARY OF THE INVENTION

The object of the present invention is to provide a composition for preparing flexible foams and the application thereof.

According to an embodiment of the present invention, a composition comprising the following components is provided:
a. an isocyanate mixture, comprising:
a1) an aliphatic and/or alicyclic isocyanate monomer, and
a2) an aliphatic and/or alicyclic isocyanate trimer,
wherein the mass ratio of said monomer to said trimer is in a range of 3:1-200:1;
b. a polymer polyol mixture, comprising:
b1) a first polyether polyol having a number average molecular weight of not less than 3000 g/mol, wherein said first polyether polyol is obtained by the polymerization of a component comprising ethylene oxide, and said first polyether polyol has an ethylene oxide content of 5-20 wt. %, based on the amount of the component for preparing said first polyether polpol as 100 wt. %,
b2) a second polyether polyol having a number average molecular weight of not less than 3000 g/mol, wherein said second polyether polyol is obtained by the polymerization of a component comprising ethylene oxide, and said second polyether polyol has an ethylene oxide content of more than 60 wt. %, based on the amount of the component for preparing said second polyether polyol as 100 wt. %, and
b3) optionally, a third polyether polyol having a number average molecular weight of not less than 500 g/mol,
wherein the mass ratio of said first polyether polyol to said second polyether polyol is in a range of 4:1-100:1, and the amount of said third polyether polyol is not more than 20 wt. %, based on the amount of said polymer polyol mixture as 100 wt. %;
c. an isocyanate-reactive group comprising compound having a number average molecular weight of 32-400 g/mol;
d. a catalyst;
e. a foaming agent; and
f. optionally, an additive;
wherein the isocyanate index of said composition is in a range of 70-120.

According to an embodiment of the present invention, a method for preparing a flexible foam comprising the following steps is provided:
i. mixing each of the components of the composition provided according to the invention, and;
ii. obtaining said flexible foam by means of foaming.

According to an embodiment of the invention, a flexible foam obtained by the reaction of the composition provided according to the invention is provided.

According to an embodiment of the invention, the use of the flexible foam provided according to the invention for the manufacture of a fabric is provided.

According to an embodiment of the invention, a fabric comprising the flexible foam provided according to the invention is provided.

The composition of the invention for preparing a flexible foam comprises a suitable isocyanate mixture and a polymer polyol mixture. A non-yellowing flexible polyurethane foam, which enables satisfying the comprehensive requirements of the textile industry for high resilience, good breathability, washing resistance, good tensile strength, high ductility, tunable hardness and hand feel of the foam, is obtained by the reaction of the composition.

DETAILED DESCRIPTION

The present invention provides a composition comprising the following components:
a. an isocyanate mixture, comprising:
a1) an aliphatic and/or alicyclic isocyanate monomer, and
a2) an aliphatic and/or alicyclic isocyanate trimer,
wherein the mass ratio of said monomer to said trimer is in a range of 3:1-200:1;
b. a polymer polyol mixture, comprising:
b1) a first polyether polyol having a number average molecular weight of not less than 3000 g/mol, wherein said first polyether polyol is obtained by the polymerization of a component comprising ethylene oxide, and said first polyether polyol has an ethylene oxide content of 5-20 wt. %, based on the amount of the component for preparing said first polyether polyol as 100 wt. %, b2) a second polyether polyol having a number average molecular weight of not less than 3000 g/mol, wherein said second polyether polyol is obtained by the polymerization of a component comprising ethylene oxide, and said second polyether polyol has an ethylene oxide content of more than 60 wt. %, based on the amount of the component for preparing said second polyether polyol as 100 wt. %, and b3) optionally, a third polyether polyol having a number average molecular weight of not less than 500 g/mol, wherein the mass ratio of said first polyether polyol to said second polyether polyol is in a range of 4:1-100:1, and the amount of said third polyether polyol is not more than 20 wt. %, based on the amount of said polymer polyol mixture as 100 wt. %;

c. an isocyanate-reactive group comprising compound having a number average molecular weight of 32-400 g/mol;

d. a catalyst;

e. a foaming agent; and f. optionally, an additive;

wherein the isocyanate index of said composition is in a range of 70-120. The present invention further provides a method for preparing a flexible foam using the composition, the prepared flexible foam and the application thereof, and a fabrics comprising the flexible foam.

Isocyanate Mixture

The isocyanate group content in said isocyanate mixture may be in a range of 20-54 wt. %, based on the amount of said isocyanate mixture as 100 wt. %.

The isocyanate group content in said isocyanate mixture is preferably in a range of 20-37.5 wt. %, based on the amount of said isocyanate mixture as 100 wt. %.

The mass ratio of said isocyanate monomer to the trimer is preferably in a range of 3:1-120:1, and most preferably in a range of 3:1-20:1.

Isocyanate Monomer

The isocyanate functionality of said isocyanate monomer is preferably 2.

The isocyanate group content in said isocyanate monomer may be in a range of 20-40 wt. %, based on the amount of said isocyanate monomer as 100 wt. %.

Said aliphatic isocyanate monomer is preferably one or more selected from the group consisting of: hexamethylene diisocyanate (HDI), 2,2-dimethyl pentamethylene diisocyanate, 2,2,4-trimethylhexamethylene diisocyanate, butylene diisocyanate, 1,3-butadiene-1,4-di isocyanate, 2,4,4-trimethyl-1,6-hexamethylene diisocyanate and lysine methyl ester diisocyanate.

Said alicyclic isocyanate monomer is preferably one or more selected from the group consisting of: isophorone diisocyanate (IPDI), isomeric bis(4,4'-isocyanatocyclohexyl)methane or their mixtures with any isomer content, 1,4-cyclohexylidene diisocyanate, 1,3-bis(isocyanatomethyl)benzene (XDI), 1,3- and/or 1,4-bis(2-isocyanatoprop-2-yl)-benzene (TMXDI), norbornane diisocyanate (NBDI), hydrogenated xylylene diisocyanate ($H_6$XDI), 1,4-cyclohexylene diisocyanate ($H_6$PPDI), 1,5-pentamethylene diisocyanate (PDI) and dicyclohexylmethane diisocyanate ($H_{12}$MDI).

Said isocyanate monomer is preferably an alicyclic isocyanate, further preferably isophorone diisocyanate and/or dicyclohexylmethane diisocyanate, and most preferably isophorone diisocyanate.

Isocyanate Trimer

The viscosity of said isocyanate trimer is preferably in a range of 1000-10000 mPa·s, as measured at 23° C. It is preferred to use a DV-II+Pro. rotational viscometer available from Brookfield Company and to perform the measurement according to DIN 53019.

The isocyanate group content in said isocyanate trimer is preferably in a range of 20-25 wt. %, based on the amount of said trimer as 100 wt. %.

Said aliphatic and/or alicyclic isocyanate trimer is preferably one or more selected from the group consisting of: isophorone diisocyanate trimer, 1,5-cyclopentane diisocyanate trimer and hexamethylene diisocyanate trimer.

The amount of said isocyanate mixture and said polymer polyol mixture may be more than 50 wt. %, and most preferably more than 85 wt. %, based on the amount of said composition as 100 wt. %.

Polymer Polyol Mixture

The hydroxyl group functionality of said polymer polyol mixture may be in a range of 2-4, and preferably in a range of 3-4.

The mass ratio of said first polyether polyol to said second polyether polyol is preferably in a range of 4:11-30:1.

First Polyether Polyol

The number average molecular weight of said first polyether polyol may be in a range of 4000-6000 g/mol.

The hydroxyl value of said first polyether polyol may be in a range of 20-80 mg KOH/g, and preferably in a range of 25-40 mg KOH/g.

The ethylene oxide content in said first polyether polyol is preferably in a range of 10-20 wt. %, based on the amount of the component for preparing said first polyether polyol as 100 wt. %.

The viscosity of said first polyether polyol is preferably in a range of 750-1500 mPa·s.

The hydroxyl group functionality of said first polyether polyol is preferably in a range of 2-4.

Said first polyether polyol is preferably one or more selected from the group consisting of: Arcol Polyol 3553, Acrol Polyol 1362 and Acrol polyol 1026.

Second Polyether Polyol

The number average molecular weight of said second polyether polyol may be in a range of 3000-6000 g/mol, and preferably in a range of 4000-5000 g/mol.

The hydroxyl value of said second polyether polyol may be in a range of 20-80 mg KOH/g, and preferably in a range of 25-40 mg KOH/g.

The ethylene oxide content in said second polyether polyol may be more than 65 wt. %, and most preferably more than 65 wt. % and less than 80 wt. %, based on the amount of the component for preparing said second polyether polyol as 100 wt. %.

The viscosity of said second polyether polyol is preferably in a range of 1000-1500 mPa·s.

The hydroxyl group functionality of said second polyether polyol may be in a range of 2-4, and preferably 3.

Said second polyether polyol is preferably Bayflex VP PU 191F03.

Optional Third Polyether Polyol

Said third polyether polyol is different from said first polyether polyol and said second polyether polyol.

The number average molecular weight of said third polyether polyol may be in a range of 500-1000 g/mol.

The hydroxyl value of said third polyether polyol may be more than 200 mg KOH/g, and preferably in a range of 200-250 mg KOH/g.

The viscosity of said third polyether polyol is preferably in a range of 200-500 mPa·s.

The hydroxyl group functionality of said third polyether polyol may be in a range of 2-4, and preferably 3.

The amount of said third polyether polyol is preferably not more than 10 wt. %, based on the amount of said polymer polyol mixture as 100 wt. %.

Said third polyether polyol is preferably obtained by the polymerization of a component that comprises no ethylene oxide.

Said third polyether polyol is preferably Arcol Polyol 1071.

Isocyanate Reactive Group Comprising Compound Having a Number Average Molecular Weight of 32-400 g/mol The isocyanate-reactive group as used herein refers to a group capable of reacting with an isocyanate group.

Said isocyanate-reactive group comprising compound having a number average molecular weight of 32-400 g/mol is preferably an aliphatic and/or alicyclic compound.

Said isocyanate-reactive group is preferably one or more selected from the group consisting of: hydroxyl, primary amino and secondary amino.

Said isocyanate-reactive group comprising compound having a number average molecular weight of 32-400 g/mol further preferably comprises at least two isocyanate-reactive groups.

Said isocyanate-reactive group comprising compound having a number average molecular weight of 32-400 g/mol is most preferably one or more selected from the group consisting of glycerol, 1,1,1-trimethylolethane, 1,1,1-trimethylolpropane, 1,2,3-trimethylolhexane, poly(propylene oxide-ethylene oxide), polypropylene oxide), poly(ethylene oxide), monoethanolamine, diethanolamine, triethanolamine, 2-amino-2-methyl-1-propanol and hydrazine.

The amount of said isocyanate-reactive group comprising compound having a number average molecular weight of 32-400 g/mol may be in a range of 0.5-5.0 wt. %, and preferably in a range of 2-3 wt. %, based on the amount of said composition as 100 wt. %.

Catalyst

The amount of said catalyst may be in a range of 0.5-3.0 wt. %, and preferably in a range of 0.5-1.5 wt. %, based on the amount of said composition as 100 wt. %.

Said catalyst may be those commonly used in the industry, for example: (1) tertiary amines such as bis(2,2'-dimethylamino)ethyl ether, bis(dimethylaminoethyl)ether, N-methylmorpholine, N-ethylmorpholine, N,N-dimethylbenzylamine, N,N-dimethylethanolamine, N,N,N',N'-tetramethyl-1,3-butanediamine, pentamethyl dipropylenetriamine, trimethylamine, triethylamine, triethanolamine, triethylenediamine, and pyridine oxide; (2) compounds containing >N—C=N— structure such as diazabicycloalkenes or guanidine-based compounds; available compounds including 1,5-diazabicyclo-(4,3,0)-5-nonene, 1,8-diazabicyclo-(5,4,0)-7-undecene, 1,8-diazabicyclo-(5,3,0)-7-decene, 1,5-diazabicyclo-(5,4,0)-5-undecene, 1,4-diazabicyclo-(3,3,0)-4-octene, guanidine, 1,3-diphenylguanidine, 1,1,3,3-tetramethylguanidine, cyclohexyltetramethylguanidine, N-dodecyltetramethylguanidine, guanidinium thiocyanate, 1,3-di(tert-butyloxycarbonyl)guanidine, 1,3-di-tert-butyloxycarbonyl-2-(2-hydroxyethyl)guanidine, 1,3-di-tert-butyloxycarbonyl-2-(carbonylmethyl)guanidine, 1,8-di(tetramethylguanidino)naphthalene, 1-(2,2-diethoxyethyl)guanidine, 1-(4-methoxyphenyl)guanidine and organic salts of diazabicycloalkenes or guanidine-based compounds such as phenates, formates, acetates and carbonates; (3) strong bases such as alkali metal salts, alkaline earth metal alkoxides, hydroxides or phenates; (4) acidic metal salts of strong acids such as stannous chloride, ferric chloride, antimony trichloride, bismuth chloride and nitrates; (5) chelates of various metals, for example, those obtained from acetylacetone, benzoylacetone, trifluoroacetylacetone, ethyl acetoacetate, salicylaldehyde, cyclopentanone-2-carboxylate, acetylacetone-imine, diacetylacetone-alkylene diimine, and salicylaldehyde imine and various metals such as Be, Mg, Zn, Pb, Ti, Zr, Sn, Bi, Mo, Mn, Fe, C, and Ni; (6) alkoxides and phenates of various metals, such as $Ti(OR)_4$ and $Al(OR)_3$, wherein R is an alkyl or aryl group, and the reaction products of an alkoxide with a carboxylic acid, a β-diketone and a 2-(N,N-dialkylamino)alkanol, for example titanium chelates obtained via such or similar steps; (7) salts of organic acids with various metals such as alkali metals and alkaline earth metals, such as calcium hexanoate; (8) organometallic derivatives of trivalent and pentavalent As, Sb and Bi, and metal carbonyl compounds of iron and cobalt.

Said catalyst is preferably tin-based catalysts and/or base catalysts.

Said tin-based catalysts are preferably organotin catalysts and/or organic stannous catalysts.

Said organotin catalysts may be one or more selected from the group consisting of: dialkyltin salts of carboxylic acids, trialkyltin hydroxides, dialkyltin oxides, dialkoxydialkyltins, dialkyltin dichlorides and dithiol dialkyltins.

Said organic stannous catalysts may be stannous salts of carboxylic acids, such as stannous acetate, stannous octoate, and stannous oleate.

Said tin-based catalysts are most preferably stannous isooctoate.

Said base catalysts may be salts of Brønsted acids and various alkali metals; and preferably sodium bicarbonate or sodium carbonate.

When said catalyst is a combination of tin-based catalysts and base catalysts, the amount of said tin-based catalysts is preferably in a range of 0.5-1.5 wt. % and the amount of said base catalysts is preferably in a range of 0.1-1.0 wt. %, based on the amount of said composition as 100 wt. %.

Foaming Agent

Said foaming agent may be water and/or other known foaming agents.

Said water reacts with said isocyanate mixture to produce carbon dioxide, resulting in flexible polyurethane foams having varying density ranges. When the water content in the composition is relatively high, more carbon dioxide can be produced and flexible polyurethane foams having a relatively low density can be obtained.

Said other known foaming agents may be hydrochloroflurocarbons and/or carbon dioxide, preferably carbon dioxide (gas or liquid).

The amount of said foaming agent may be in a range of 0.3-5.0 wt. %, and preferably in a range of 0.5-2.5 wt. %, based on the amount of said composition as 100 wt. %.

Additive

The amount of said additive is preferably in a range of 0.5-15 wt. %, based on the amount of said composition as 100 wt. %.

Said additive may be one or more selected from the group consisting of: surfactants, pigments, antioxidants, UV light absorbers, UV light stabilizers, flame retardants, fillers, recycled foam powders, antimicrobial compounds and antistatic agents.

Said surfactant may be one or more selected from the group consisting of: polysiloxane-polyalkylene oxide copolymers, silicon-free nonionic surfactants, cationic surfactants, anionic surfactants, and polymeric surfactants with a relative molecular weight of higher than 1,000 g/mol.

Said polysiloxane-polyalkylene oxide copolymer is preferably a polysiloxane-polyalkylene oxide copolymer having a hydrophilic-lipophilic balance (HLB) between 3-33, and most preferably a polysiloxane-polyalkylene oxide copolymer having an HLB between 6-20.

Said silicon-free nonionic surfactant is preferably a silicon-free non-ionic surfactant having an HLB between 1-20, and most preferably a silicon-free non-ionic surfactant having an HLB between 6-20.

Said surfactant is most preferably Niax silicone Y-10366.

The amount of said surfactant is preferably in a range of 1-2 wt. %, based on the amount of said composition as 100 wt. %.

Although the flexible polyurethane foam of the present invention does not tend to discolor under the exposure of ultraviolet (UV) radiation, UV light stabilizers, UV light absorbers, or antioxidants may be added into said composition in order to improve the light stability of the foam.

Said UV light stabilizer is preferably a hindered amine UV light stabilizer.

Said hindered amine UV light stabilizer is preferably one or more selected from the group consisting of: di(2,2,6,6-tetramethylpiperidinyl)sebacate, poly[[6-[(1,1,3,3-tetramethylbutyl)amino]-s-triazine-2,4-diyl]-[(2,2,6,6-tetramethyl-4-piperidinyl)imino]-hexamethylene-[(2,2,6,6-tetramethyl-4-piperidinyl)imino]] (CAS No, 71878-19-8), di(1,2,2,6,6-pentamethyl-4-piperidinyl)-[[3,5-di(1,1-dimethylethyl)-4-hydroxyphenyl]methyl]butylmalonate and 4-benzoyloxy-2,2,6,6-tetramethylpiperidine.

Said UV light absorbers may be salicylates, benzotriazoles and benzophenones.

Said salicylates are preferably phenyl salicylate and/or tert-butylphenyl salicylate.

Said benzotriazoles are preferably one or more selected from the group consisting of: 2-(2'-hydroxy-3',5'-diisopentylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole and 2-(2'-hydroxy-3',5'-di-tert-butylphenyl) benzotriazole.

Said benzophenones are preferably one or more selected from the group consisting of: 2,2'-dihydroxy-4,4'-dimethoxybenzophenone, 2-hydroxy-4-n-octyloxybenzophenone, 2,2'-dihydroxy-4-methoxybenzophenone and 2-hydroxy-4-methoxybenzophenone.

Said antioxidant can be a free-radical chain blocking agent and/or peroxide decomposer.

Said peroxide decomposer is preferably thioesters and/or phosphites.

The amount of said antioxidant or UV absorber is preferably in a range of 0.5-5 wt. %, based on the amount of said composition as 100 wt. %.

The isocyanate index of said composition is preferably in a range of 100-120.

A Method for Preparing a Flexible Foam

The mixing of each of the components of said step i can be carried out at the same time.

The mixing of each of the components of said step i can also be carried out step by step. For example, the components except for component a and component d of said composition are mixed previously, followed by adding said component d and finally adding component a.

The cream time of said method is preferably not more than 35 seconds, and the rise time is preferably not more than 300 seconds.

The cream time refers to the period required for starting from the mixing of the isocyanate mixture and other components in the composition till the obtained mixture turns into a whitish cream.

The rise time refers to the period required for starting from the mixing of the isocyanate mixture and other components in the composition till the completion of the foaming.

The component b can be premixed or each of the polyether polyols can also be added one by one. Preference is given to the former.

The component a can be premixed or each of the isocyanates can also be added one by one. Preference is given to the former.

Flexible Foam

The density of said flexible foam can be in a range of 20-120 kg/m$^3$, and preferably in a range of 20-80 kg/m$^3$.

The air flow rate of said flexible foam is preferably not less than 30 L/min; the drop-ball rebound rate is preferably not less than 35%; the UV stability is preferably not less than 4; and the washing deformation rate is preferably zero.

Use for Manufacturing a Fabric

Said fabric can be a pillow, a back cushion, a garment pad, or a vamp.

EXAMPLES

All technical and scientific terms used herein share the same meaning as generally understood by a person skilled in the art, unless otherwise defined. In case of conflict between the definitions of terms in this specification and the meanings generally understood by a person skilled in the art, the definitions set forth herein shall control.

All values for expressing the amounts of ingredients and reaction conditions, etc. used in the specification and claims are to be understood as being modified by the term "about", unless otherwise specified. Therefore, the numerical parameters set forth herein are approximations that can vary depending upon the desired properties required to be Obtained, unless indicated to the contrary.

As used herein, "and/or" refers to one or all of the elements mentioned.

As used herein, "including" and "comprising" covers the situation of only the recited elements existing and the situation of other elements not mentioned existing besides the recited elements.

All percentages in the present invention are percentages by weight, unless otherwise specified.

The analytical measurements of the present invention were performed at 23° C., unless otherwise specified.

The number average molecular weight was determined at 23° C. by gel permeation chromatography using tetrahydrofuran as the mobile phase with reference to polystyrene standard.

The hydroxy/value was determined according to ASTM D4274.

The isocyanate group (NCO) content was determined by volume according to DIN-EN ISO 11909 and the data obtained includes the free and potentially free NCO content.

The viscosity was measured using a DV-II+Pro, rotational viscometer available from Brookfield Company according to DIN 53019 at 23° C.

Isocyanate index=(total mole number of NCO of the composition/total mole number of NCO reactive components of the composition)*100.

The ethylene oxide content in the polyether polyol refers to the percentage by weight of the ethylene oxide component based on all components for preparing the polyether polyol during the preparation of the polyether polyol.

Calculation method of the isocyanate group content in the isocyanate mixture: Σ(weight of each of the isocyanate components×corresponding isocyanate group content (NCO %))/sum of the weight of each of the isocyanate components. The isocyanate group content in the isocyanate mixture can also be determined by volume according to DIN-EN ISO 11909, and the data obtained includes the free and potentially free NCO content.

Raw Materials and Reagents

Desmodur® I: isophorone diisocyanate (IPDI), having an isocyanate group (NCO) content of 37.5±0.5%, a viscosity of 10 mPa·s and a NCO functionality of 2, purchased from Covestro Polymers (China) Co., Ltd.

Desmodur® W: dicyclohexylmethane diisocyanate ($H_{12}MDI$), having a NCO group content of 31.8%+0.5%, a viscosity of 30 mPa·s and a NCO functionality of 2, purchased from Covestro Polymers (China) Co., Ltd.

Desmodur XP2838: isophorone diisocyanate trimer, having a NCO content of 21±0.5%, a HDI monomer content of <0.2%, a IPDI monomer content of <0.15% and a viscosity (23° C.) of 2700 mPa·s, purchased from Covestro Polymers (China) Co., Ltd.

Desomodur N7300: 1,5-pentamethylene diisocyanate trimer (hereinafter abbreviated as PDI trimer), having a NCO content of 21.5% and a viscosity of 9500 mPa·s, purchased from Covestro Polymers (China) Co., Ltd.

Desomodur N3600: hexamethylene diisocyanate trimer, having a NCO content of 23±0.5%, a HDI monomer content of <0.25% and a viscosity of 1100 mPa·s, purchased from Covestro Polymers (China) Co., Ltd.

Desomodur N3300: hexamethylene diisocyanate trimer, having a NCO content of 21.8±10.3%, a HDI monomer content of <0.15% and a viscosity of 2500 mPa·s, purchased from Covestro Polymers (China) Co., Ltd.

Arcol Polyol 3553: a polyether triol having a hydroxyl value of approximately 35 mg KOH/g, a number average molecular weight of 4800 g/mol, a viscosity of 1000 mPa·s, a hydroxyl functionality of 3 and a EO content of 14 wt. %, purchased from Covestro Polymers (China) Co., Ltd.

Arcol Polyol 1362: a polyether triol having a hydroxyl value of approximately 28 mg KOH/g, a number average molecular weight of 6000 g/mol, a viscosity of 1200±200 mPa·s, a hydroxyl functionality of 3 and a EO content of 15 wt. %, purchased from Covestro Polymers (China) Co., Ltd.

Arcol Polyol 1026: a polyether diol having a hydroxyl value of approximately 28 mg KOH/g, a number average molecular weight of 4000 g/mol, a viscosity of 880±100 mPa·s, a hydroxyl functionality of 2 and a EU content of 20 wt. %, purchased from Covestro Polymers (China) Co., Ltd.

Bayflex VP PU 191F03: a high active polyether polyol having a hydroxyl value of approximately 37 mg KOH/g, a number average molecular weight of 4550 g/mol, a viscosity of approximately 1070 mPa·s, a hydroxyl functionality of 3 and a EO content of 71 wt. %, purchased from Covestro Polymers (China) Co., Ltd.

Arcol Polyol 1071: a polyether triol having a hydroxyl value of approximately 235 mg KOH/g, a number average molecular weight of 700 g/mol, a viscosity of approximately 250 mPa·s and a hydroxyl functionality of 3, purchased from Covestro Polymers (China) Co., Ltd.

Arcol Polyol 5603: a polyether triol having a hydroxyl value of approximately 56 mg KOH/g, number average molecular weight of 3000 g/mol, a viscosity of 530 mPa·s and a hydroxyl functionality of 3, purchased from Covestro Polymers (China) Co., Ltd.

GLY: glycerin, with a purity of ≥99%, purchased from Sinopharm Chemical Reagents Co., Ltd., used as an isocyanate-reactive group comprising compound having a number average molecular weight of 32-400 g/mol.

TEOA: triethanolamine, with a purity of ≥99.0%, purchased from Sinopharm Chemical Reagents Co., Ltd., used as an isocyanate-reactive group comprising compound having a number average molecular weight of 32-400 g/mol.

DEOA: diethanolamine, with a purity of ≥99.0%, purchased from Sinopharm Chemical Reagents Co., Ltd., used as an isocyanate-reactive group comprising compound having a number average molecular weight of 32-400 g/mol.

Sodium carbonate aqueous solution: sodium carbonate was weighed and dissolved in water to obtain an aqueous solution with a mass fraction (sodium carbonate) of 10%. The sodium carbonate solid has a purity of ≥99.0%, and is purchased from Sinopharm Chemical Reagents Co. LTD; and the water is produced using the Ming-Che-D24UV Water Purification Unit available from Millipore Co., Ltd.

Niax silicone Y-10366: a surfactant, purchased from Momentive Performance Materials Inc., used as an additive.

Niax CS_22LF: a surfactant, having a hydroxyl value of approximately 350 mg KOH/g and a viscosity (23° C.) of 650 mPa·s, purchased from Momentive Performance Materials Inc., used as an additive.

Dabco T-9: stannous octoate, a catalyst, purchased from American Air Products & Chemicals Inc., Ltd, used as a catalyst.

Test Method

Foam density: measured according to the standard ASTM D3574.

Drop-ball rebound rate: measured according to the standard ASTM D3574.

Compression force deflection at 40%: CFD (Compression Force Deflection) 40%, measured according to the standard ASTM D3574.

Tensile strength: Measured according to the standard ASTM D3574.

Elongation: measured according to the standard ASTM D3574.

Air flow rate: measured with IDM's F0023 digital foam porosity tester according to the standard ASTM D3574 under the test conditions of 23° C., at 1 atm. When the foam with a dimension (length×width×height) of 50 mm×50 mm×25 mm is kept under a pressure difference of 125 Pa, the volume of air passing through the foam per unit time is measured to obtain an air flow rate in a unit of L/min.

UV stability: measured with Q-Lab's QUV/se UV accelerated weathering tester according to the standard GB/T 23983-2009. The test is carried out using an UVA-340 UV lamp with an irradiance of 0.68 $W/m^2$ and a black panel temperature of (60±3)° C. in exposure to light for continuous 24 hours. The result is expressed in a scale of 1-5 compared with a standard grayscale card.

Washing deformation rate: measured with a Whirlpool's 3LWTW4840YW washing machine and a 3LWED4900YW clothes dryer according to the standard AATCC 135-2012. The test is carried out using AATCC 1993 standard laundry powder, AATCC standard test fabrics TYPE 1 under ordinary water flow setting with the water temperature of 60±3° C., drum-type ordinary drying with the drying temperature of 66±5° C. and the cooling time of 10 min, and washing for once and drying for once. The foam sample has a dimension of 5 cm×5 cm×5 cm and the mark distance is 3.5 cm. The result is shown in volume change rate.

Foam Test References

Table 1 is the foam performance test indices and the references thereof.

TABLE 1

Foam Performance Test Indices and References thereof.

| Foam performance test index | References |
|---|---|
| Cream time | <35 s, the shorter the time, the higher the reaction efficiency of the composition. |
| Rise time | <300 s, the shorter the time, the higher the reaction efficiency of the composition. |
| Drop-ball rebound rate | >50%, the greater the percentage value, the higher the rebound resilience of the foam. |
| Air flow rate | ≥30 L/min. the greater the air flow rate, the better the breathability of the foam. |
| Washing deformation rate | 0 indicates that the foam has a good washing resistance and is not easily deformable; negative values indicate foam is susceptible to deformation. |
| UV stability | 1→5, scales 4 and 5 represents that there is no color change visible to the naked eye, indicating that the foam is not susceptible to yellowing. Scale 1 refers to that the foam becomes dark and is susceptible to yellowing. |

The tensile strength and elongation indices of the foam indicate its tensile and ductibility; and CFD 40% of the foam indicates its tunability in hardness and hand feel.

Preparation of Flexible Foam Campus

According to the components shown in Table 2 and Table 3, each of the components was stored in a room at 23° C. for at least 24 hours. In a 1.5-liter stainless steel cup or plastic beaker, the components except for the isocyanates and the catalyst were premixed within 40 seconds using a Pendraulic mixer at a rotation speed of 1500 rpm. The catalyst was then added into the cup and stirred continuously for additional 20 seconds using the Pendraulic mixer at a rotation speed of 1500 rpm. Each of the isocyanate components were then added into the cup and stirred for 7 seconds using the Pendraulic mixer at a rotation speed of 3000 rpm to obtain a mixture. The mixture was poured into a paper-lined wooden box of 45 cm (length)×45 cm (width)×45 cm (height) opened at the top to foaming. When the foam height no longer changed, the form was removed from the wooden box after standing for 10 minutes and then stored in a ventilated room at 23° C. for at least 72 hours.

Foam samples of various dimensions which met the test requirements were cut out from the foam using an electric saw machine. The foam samples were placed hermetically in a room with a humidity of 50% at 23° C. for at least 24 hours before each of the properties of the foam samples was tested.

TABLE 2

Components of the Compositions of Examples 1-12 and Properties of Flexible Foams

| | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Components, unit: g | | | | | | | | | | | | |
| Arcol Polyol 3553 | | | | | | | 200 | | | | | |
| Arcol Polyol 1362 | 200 | 200 | 200 | 200 | 200 | 200 | | 200 | | 200 | 200 | 200 |
| Arcol Polyol 1026 | | | | | | | | | 200 | | | |
| Bayflex VP PU 19IF03 | 24 | 8 | 12 | 12 | 12 | 20 | 10 | 12 | 12 | 15 | 48 | 2 |
| Arcol Polyol 1071 | | | | | 20 | 10 | | | | | | |
| Desmodur I | 116 | 102 | 109 | 108 | 118 | 105 | 107 | 108 | 108 | 54 | 103 | 104 |
| Desmodur W | | | | | | | | | | 54 | | |
| Desmodur XP2838 | 1 | | | | | | | | | | | |
| Desomodur N7300 | | 26 | | | | | | | | | | |
| Desomodur N3600 | | | | 12 | 13 | 12 | 19 | 12 | 12 | | 26 | |
| Desomodur N3300 | | | 12 | | | | | | | 27 | | 18 |
| GLY | | | 3.5 | | | | | | 3.5 | | | |
| TEOA | 5.74 | 5.74 | | 5.74 | 5.74 | 5.74 | 5.74 | | 5.74 | 5.74 | 5.74 | 5.74 |
| DEOA | 4 | 4 | 4 | 4 | 4 | 4 | 4 | 4 | 4 | 4 | 4 | 4 |
| Sodium carbonate aqueous solution | 6.1 | 6.1 | 6.1 | 6.1 | 6.1 | 6.1 | 6.1 | 6.1 | 6.1 | 6.1 | 6.1 | 6.1 |
| Niax silicone Y-10366 | 6 | 6 | 6 | 12 | 6 | 6 | 6 | 6 | 6 | 6 | 6 | 6 |
| Niax CS_22LF | 1.5 | 1.5 | 1.5 | 1.5 | 1.5 | 1.5 | 1.5 | 1.5 | 1.5 | 1.5 | 1.5 | 1.5 |
| Dabco T-9 | 4 | 4 | 4 | 4 | 4 | 4 | 4 | 4 | 4 | 4 | 4 | 4 |
| Isocyanate index | 108 | 108 | 108 | 108 | 108 | 108 | 108 | 108 | 108 | 108 | 108 | 108 |
| Properties of Flexible Foams | | | | | | | | | | | | |
| Visual appearance | ok | ok | ok | ok | ok | ok | ok | ok | ok | ok | ok | ok |
| Cream time (s) | 23 | 21 | 30 | 22 | 25 | 25 | 23 | 30 | 19 | 28 | 27 | 17 |
| Rise time (s) | 197 | 145 | 163 | 151 | 168 | 170 | 145 | 111 | 121 | 191 | 225 | 114 |
| Foam density (kg/m³) | 47.2 | 45.7 | 37.7 | 45.8 | 47.7 | 49.6 | 46.3 | 48.1 | 41.7 | 58.2 | 61.0 | 47.6 |
| Drop-ball rebound rate (%) | 64 | 64 | 52 | 59 | 50 | 55 | 58 | 58 | 54 | 69 | 63 | 64 |
| CFD 40% (kPa) | 2.6 | 2.5 | 2.9 | 2.6 | 3.7 | 2.2 | 3.6 | 2.4 | 1.8 | 3.1 | 2.2 | 3.0 |
| Tensile strength (kPa) | 121.5 | 116.6 | 135.8 | 121.8 | 127.0 | 82.0 | 140.8 | 128.2 | 127.2 | 73.7 | 37.8 | 144 |
| Elongation (%) | 147 | 140 | 147 | 151 | 148 | 124 | 137 | 170 | 220 | 94 | 74.9 | 153.7 |
| Air flow rate (L/min) | 71 | 69 | 43 | 59 | 67 | 57 | 30 | 45 | 51 | 61 | 55 | 68 |
| UV stability | 5 | 5 | 5 | 5 | 5 | 5 | 5 | 5 | 5 | 5 | 5 | 5 |
| Washing deformation rate (%) | 0 | 0 | 0 | 0 | 0 | 0 | 0 | 0 | 0 | 0 | 0 | 0 |

It can be seen from Table 2 that the cream time and rise time of the composition of the examples according to the present invention are short and the reaction efficiency is high. The flexible polyurethane foams prepared from the composition of the examples according to the present invention not only have good tensile strength, ductility, hardness and hand feel tunability, but also have good non-yellowing property, rebound resilience, breathability, and washing resistance. Thus said foams can meet the requirements for flexible polyurethane foams in the textile industry.

It can be seen from Comparative Example 3 that when the mass ratio of the first polyether polyol to the second polyether polyol of the composition is less than 4:1, the cream time is long and the reaction efficiency is low. The foam prepared collapses which leads to a failure in the performance testing.

It can be seen from Comparative Example 6 that when the mass ratio of the isocyanate monomer to the trimer of the composition is less than 3:1, the cream time is long, the rise time is long and the reaction efficiency is low. The foam

TABLE 3

Components of the Compositions of Comparative Examples 1-6 and Properties of Flexible Foams

| | Comparative Example 1 | Comparative Example 2 | Comparative Example 3 | Comparative Example 4 | Comparative Example 5 | Comparative Example 6 |
|---|---|---|---|---|---|---|
| Components of the Comparative Examples | | | | | | |
| Arcol Polyol 3553 | | | | | | |
| Arcol Polyol 1362 | 200 | | 200 | 200 | | 200 |
| Arcol Polyol 5603 | | 200 | | | 200 | |
| Bayflex VP PU 19IF03 | 12 | | 65 | | 10 | 12 |
| Desmodur I | 116 | | 112 | 106 | 115 | 1.9 |
| Desmodur W | | 150 | | | | |
| Desomodur N3600 | | | 14 | | 20 | 186 |
| Desomodur N3300 | | | | 15 | | |
| GLY | 3.5 | | 3.5 | 3.5 | | |
| TEOA | | 5.74 | | | 5.74 | 5.74 |
| DEOA | 4 | 4 | 4 | 4 | 4 | 4 |
| Sodium carbonate aqueous solution | 6.1 | 6.1 | 6.1 | 6.1 | 6.1 | 6.1 |
| Niax silicone Y-10366 | 6 | 6 | 6 | 12 | 6 | 6 |
| Niax CS_22LF | 1.5 | 1.5 | 1.5 | 1.5 | 1.5 | 1.5 |
| Debco T-9 | 4 | 4 | 4 | 4 | 4 | 4 |
| Isocynate index | 108 | 108 | 108 | 108 | 108 | 108 |
| Properties of Flexible Foams of the Comparative Examples | | | | | | |
| Visual appearance | Ok | Severe shrinkage | cell collapse | Ok | Severe shrinkage | Foam breaking and powdering |
| Cream time (s) | 28 | 90 | 40 | 38 | 28 | 84 |
| Rise time (s) | 114 | >480 | 191 | 120 | 180 | >300 |
| Foam density (kg/m$^3$) | 43.7 | / | / | 53.1 | / | / |
| Drop-ball rebound rate (%) | 56 | / | / | 69 | / | / |
| CFD 40% (kPa) | 2.6 | / | / | 3.9 | / | / |
| Tensile strength (kPa) | 151.4 | / | / | 173 | / | / |
| Elongation (%) | 184 | / | / | 113.6 | / | / |
| Air flow rate (L/min) | 24 | / | / | 36 | / | / |
| UV stability | 5 | / | / | 5 | / | / |
| Washing deformation rate (%) | −25.2 | / | / | −18.0 | / | / |

By comparing the foam properties of Example 8 and Comparative Example 1, the composition of Comparative Example 1 does not comprise an isocyanate trimer. The foam prepared has poor breathability and poor washing resistance.

By comparing Example 3 and Comparative Example 4, the composition of Comparative Example 4 which does not comprise the second polyether polyol has a long cream time and a low reaction efficiency. The foam prepared has poor washing resistance.

By comparing Example 7 and Comparative Example 5, the composition of Comparative Example 5 does not comprise the first polyether polyol. The foam prepared therefrom severely shrinks which leads to a failure in the performance testing.

It can be seen from Comparative Example 2 that when the composition does not comprise the second polyether polyol and the isocyanate trimer, the composition has a long cream time, a long rise time and a low reaction efficiency. And the foam prepared severely shrinks which leads to a failure in the performance testing.

prepared breaks and shatters into powder which leads to a failure in the performance testing.

It is easily known for a person skilled in the art that the present invention is not limited to the specific details as described above. The present invention may be embodied in other specific forms without departing from the spirit or main characteristics of the present invention. The embodiments as described are therefore to be considered in all respects as illustrative instead of restrictive, so that the scope of the invention is indicated by the claims rather than the foregoing description; and thus any changes should be regarded as belonging to the present invention as long as the changes are within the meaning and scope of the equivalents of the claims.

The invention claimed is:

1. A composition comprising the following components:
   a) an isocyanate mixture, comprising:
      a1) an aliphatic and/or alicyclic isocyanate monomer, and
      a2) an aliphatic and/or alicyclic isocyanate trimer, wherein the mass ratio of said monomer to said trimer is in a range of 3:1-200:1;
b) a polymer polyol mixture, comprising:
   b1) a first polyether polyol having a number average molecular weight of not less than 3000 g/mol, wherein said first polyether polyol is obtained by the polymerization of a component comprising ethylene oxide, and said first polyether polyol has an ethylene oxide content of 5-20 wt. %, based on the amount of the component for preparing said first polyether polyol as 100 wt. %,
   b2) a second polyether polyol having a number average molecular weight of not less than 3000 g/mol, wherein said second polyether polyol is obtained by the polymerization of a component comprising ethylene oxide, and said second polyether polyol has an ethylene oxide content of more than 60 wt. %, based on the amount of the component for preparing said second polyether polyol as 100 wt. %, and
   b3) optionally, a third polyether polyol having a number average molecular weight of not less than 500 g/mol,
wherein the mass ratio of said first polyether polyol to said second polyether polyol is in a range of 4:1-100:1, and the amount of said third polyether polyol is not more than 20 wt. %, based on the amount of said polymer polyol mixture as 100 wt. %;
c) an isocyanate-reactive group comprising compound having a number average molecular weight of 32-400 g/mol;
d) a catalyst;
e) a foaming agent; and
f) optionally, an additive;
wherein the isocyanate index of said composition is in a range of 70-120.

2. The composition according to claim 1, wherein the mass ratio of said monomer to said trimer is in a range of 3:1-120:1.

3. The composition according to claim 1, wherein the alicyclic monomer is isophorone diisocyanate and/or dicyclohexylmethane diisocyanate.

4. The composition according to claim 1, wherein alicyclic isocyanate trimer is one or more selected from the group consisting of isophorone diisocyanate trimer, and 1,5-cyclopentane diisocyanate trimer, or wherein the aliphatic isocyanate trimer is hexamethylene diisocyanate trimer.

5. The composition according to claim 1, wherein the mass ratio of said first polyether polyol to said second polyether polyol is in a range of 4:1-30:1.

6. The composition according to claim 1, wherein the ethylene oxide content in said first polyether polyol is in a range of 10-20 wt. %, based on the amount of the component for preparing said first polyether polyol as 100 wt. %.

7. The composition according to claim 1, wherein the ethylene oxide content in said second polyether polyol is more than 65 wt. %, based on the amount of the component for preparing said second polyether polyol as 100 wt. %.

8. A method for preparing a flexible foam, comprising the following steps:
   i. mixing each of the components of the composition according to claim 1; and
   ii. obtaining said flexible foam by means of foaming.

* * * * *